United States Patent [19]

Yabe et al.

[11] Patent Number: 4,731,620

[45] Date of Patent: Mar. 15, 1988

[54] INFORMATION RECORDING MEDIUM

[75] Inventors: Masao Yabe; Younosuke Takahashi, both of Fujinomiya, Japan

[73] Assignee: Fuji Photo Film Co., Ltd., Japan

[21] Appl. No.: 13,900

[22] Filed: Feb. 12, 1987

[30] Foreign Application Priority Data

Feb. 12, 1986 [JP] Japan .................................. 61-28242

[51] Int. Cl.[4] ............................................. G01D 15/34
[52] U.S. Cl. ...................................... 346/137; 428/65; 430/270; 369/284; 369/286; 369/288
[58] Field of Search ..................... 428/64, 65; 369/284, 369/286, 288; 430/270, 945; 346/137, 135.1

[56] References Cited

U.S. PATENT DOCUMENTS 4,616,238 10/1986 Tani et al. ........................... 346/137

Primary Examiner—Alexander S. Thomas
Attorney, Agent, or Firm—Gerald J. Ferguson, Jr.; Michael P. Hoffman; Michael J. Foycik, Jr.

[57] ABSTRACT

Improvement in an information recording medium comprising two disc-shaped substrates, said two substrates being combined with each other directly or via ring-shaped spacers by an adhesive, and a recording layer for writing or reading information with laser beam which is provided on the inner surface of at least one substrate, wherein a layer of chlorinated polyolefin is provided between the substrate and the recording layer and further on the area where the substrate is combined with another substrate or the spacers, and said adhesive is a UV-curable epoxy adhesive which is arranged on the chlorinated polyolefin layer, optionally, via a primer layer.

11 Claims, 3 Drawing Figures

INFORMATION RECORDING MEDIUM

BACKGROUND OF THE INVENTION

1. Field of the Invention

The present invention relates to an information recording medium in the form of a disc for writing or reading information by means of laser beam of high energy density.

2. Description of Prior Arts

Information recording media utilizing a beam of high energy density such as laser beam have been developed in recent years and are put into practical use. The recording medium is called an optical disc and the practical applications thereof have been found, for example, as video disc and audio disc as well as disc memory for large-capacity computer and large-capacity static image file.

The optical disc basically comprises a disc-shaped transparent substrate of a plastic or glass material and a recording layer composed of a metal such as Bi, Sn, In or Te or a semi-metal provided on said substrate. On the surface of the substrate where the recording layer is to be coated is generally provided an additional layer such as an undercoating layer or an intermediate layer for improving smoothness of the surface of the substrate, and for increasing adhesion to the recording layer and sensitivity of the resulting disc. Writing of information on the optical disc can be conducted, for example, by irradiating the optical disc with laser beam. Under irradiation with the laser beam, the irradiated area of the recording layer of the optical disc absorbs energy of the beam, rise in temperature locally occurs, and as a result chemical or physical change is caused to alter optical characteristics of the recording layer in the irradiated area, whereby the recording of information can be made. Reading of information from the optical disc is also conducted by irradiating the optical disc with laser beam. The information can be reproduced by detecting reflected light or transmitted light corresponding to the alteration of the optical characteristics of the recording layer.

As disc structures for protecting the recording layer, there have been proposed two sheet structures. One is a directly-combined structure in which a recording layer is provided on at least one of two disc-shaped substrates and positioned inside the two substrates opposed to each other, the two substrates being combined directly with each other on their peripheries by means of an adhesive. Another is an air-sandwich structure in which a recording layer is provided on at least one of two disc-shaped substrates and positioned inside the two substrates opposed to each other at a certain distance, the two substrates being combined with each other via a ring-shaped inner spacer and a ring-shaped outer spacer by an adhesive so as to form a closed space surrounded by the two substrates and two spacers. In the optical disc having such structure, the recording layer is not directly exposed to outer air, and the recording and reproduction of information can be conducted with laser beam passing through the transparent substrate. Accordingly, there is little possibility that the recording layer is physically or chemically damaged or the surface is covered with dust which is to interfere with the recording and reproduction of information of the recording medium.

However, the information recording disc having the above-mentioned directly-combined structure or air-sandwich structure has insufficient mechanical strength in the region (i.e., area) combined by the adhesive, whereby the disc is easily damaged, as compared with a recording disc of simple structure comprising one substrate and a recording layer provided thereon. In more detail, in certain cases, stress is produced in the disc having such structure due to expansion or contraction of the substrate depending on the conveying conditions or storage conditions such as temperature or humidity. Further, particularly in the case of air-sandwich structure, stress is also produced by expansion of air in the closed space. In these cases, the stress tends to concentrate on the adhesive layer (i.e., adhesive-combined portion of the disc), and hence the substrate is liable to separate from each other or from the spacer. In addition to the disadvantage, it is required for the disc of air-sandwich structure to select such adhesive as not producing deterioration of the recording layer through diffusion of decomposition products of the adhesive. There are some cases that a suitable adhesive having satisfactory adhesion for the employed substrate is hardly found out.

Furthermore, in some cases, even if the recording disc is not damaged, the combined region of the disc is deteriorated in sealing property to allow outer air containing water vapor to pass into the disc, whereby the sensitivity of the recording disc decreases.

SUMMARY OF THE INVENTION

It is an object of the present invention to provide an information recording medium wherein adhesion strength is improved between the opposed substrates or between the substrates and the spacers.

It is another object of the invention to provide an information recording medium improved in physical and mechanical endurance.

It is a further object of the invention to provide an information recording medium improved in recording characteristics.

The present invention provides an improvement in an information recording medium comprising two disc-shaped substrates, said two substrates being combined with each other directly or via ring-shaped spacers by an adhesive, and a recording layer for writing or reading information with laser beam which is provided on the inner surface of at least one substrate, wherein a layer of chlorinated polyolefin is provided between the substrate and the recording layer and further on the area where the substrate is combined with another substrate or the spacers, and said adhesive is a UV(ultraviolet)-curable epoxy adhesive which is arranged on the chlorinated polyolefin layer, optionally, via a primer layer.

In the information recording medium of the invention comprising two disc-shaped substrates combined with each other directly, the two substrates are combined with each other by a combination of the chlorinated polyolefin layer arranged on one substrate, a UV-curable epoxy adhesive layer arranged on the chlorinated polyolefin layer and another chlorinated polyolefin layer arranged on another substrate.

In the information recording medium of the invention comprising two disc-shaped substrates combined with each other via spacers, the two substrates are combined with each other via spacers wherein one substrate and the spacers are combined by a combination of the chlorinated polyolefin layer arranged on the substrate and a UV-curable epoxy adhesive layer arranged on the chlorinated polyolefin layer.

In both of the above two cases, a primer layer can be inserted between the chlorinated polyolefin layer and the adhesive layer.

Therefore, adhesion strength between the substrate and the adhesive layer is improved, and the information medium of the invention shows improved resistance to mechanical distortion or mechanical shock. Accordingly, the information medium of the invention shows not only improved mechanical endurance (i.e., strength) but also improved recording characteristics.

In more detail, the above-mentioned chlorinated polyolefin and ultraviolet ray-curable epoxy adhesive (optionally in additional combination with a primer) undergo interdiffusion therebetween in the combined region of the recording medium of the invention, and thereby the medium can maintain high adhesion in the combined region even when the medium is conveyed or stored under severe environmental conditions such as a high temperature or a high humidity. Accordingly, the recording medium of the invention is effectively prevented from damages caused by distortion of the substrate, etc., and thereby the physical or mechanical endurance of the medium can be prominently enhanced.

Further, the combined region can be prevented from reduction of sealing property with time, so that the recording sensitivity of the medium can be maintained at a high level.

DETAILED DESCRIPTION OF THE INVENTION

Figure 1:
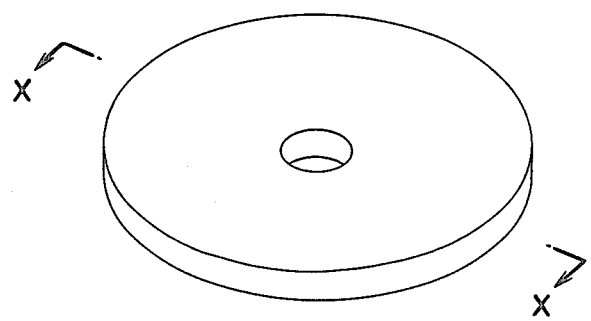
FIG. 1 is a perspective view schematically illustrating an appearance of an information recording medium of air-sandwich structure which is a typical example of the information recording medium according to the present invention.
Figure 2:
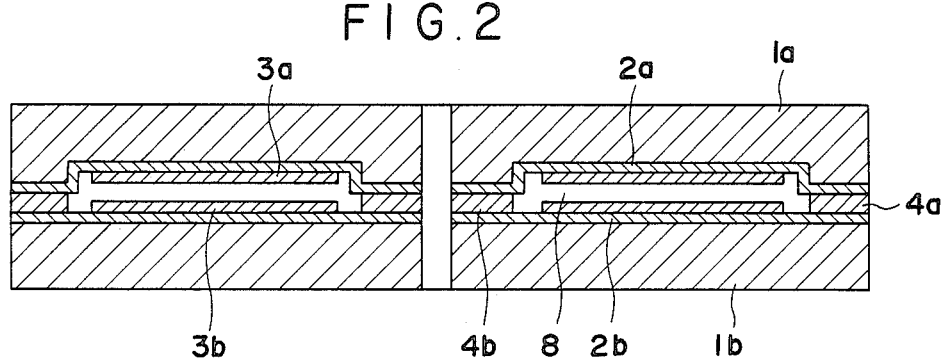
FIG. 2 is a cross-sectional view of the information recording medium of air-sandwich structure taken along the line X—X in FIG. 1.

A typical structure of the information recording medium of the present invention is illustrated in FIGS. 1 and 2, wherein FIG. 1 schematically shows an appearance of the recording medium and FIG. 2 shows a constitution of the medium of FIG. 1 by way of a sectional view.

In FIG. 2, two disc-shaped substrates 1a, 1b are provided with chlorinated polyolefin layers 2a, 2b and recording layers 3a, 3b, respectively. These substrates 1a, 1b are combined with (i.e., bonded to) each other via the chlorinated polyolefin layers 2a, 2b and the adhesive layers 4a, 4b, whereby a closed space 8 is formed.

Figure 3:
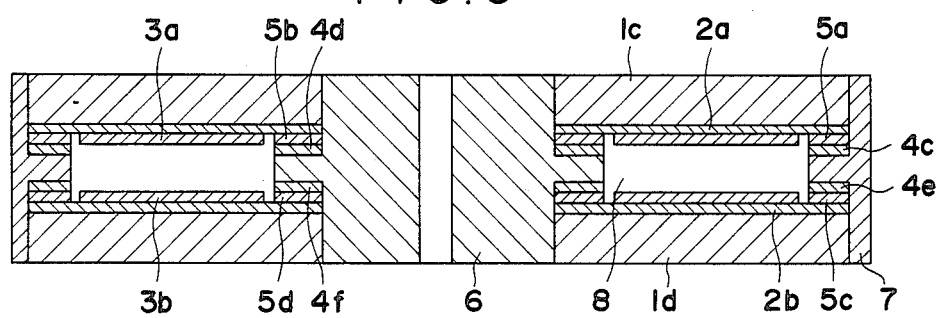
FIG. 3 is a cross-sectional view illustrating another example of an information recording medium of air-sandwich structure according to the invention.

Another embodiment of the information recording medium of the invention is illustrated in FIG. 3. In FIG. 3, two disc-shaped substrates 1c, 1d are provided with chlorinated polyolefin layers 2a, 2b and recording layers 3a, 3b, respectively. These substrates 1a, 1b are bonded to each other by interposing therebetween a ring-shaped inner spacer 6 and a ring-shaped outer spacer 7 via chlorinated polyolefin layers 2a, 2b, primer layers 5a, 5b, 5c, 5d, and adhesive layers 4c, 4d, 4e, 4f, respectively, whereby a closed inner space 8 is formed.

FIGS. 2 and 3 show structural examples of the information recording medium according to the present invention, but these examples are given by no means to limit the information recording medium of the invention.

The information recording medium of the present invention can be prepared, for example, in the following manner.

The substrate material employed in the invention can be selected from those employed as the substrates of the conventional recording media. From the viewpoints of optical characteristics, smoothness, workability, handling properties, long-term stability and manufacturing cost, preferable examples of the substrate material include glasses such as soda-lime glass, acrylic resins such as cell-cast polymethyl methacrylate and injection-molded polymethyl methacrylate; vinyl chloride resins such as polyvinyl chloride and vinyl chloride copolymer; polycarbonate resins; and epoxy resins. Among those materials, most preferred is polycarbonate resin from the viewpoints of dimensional stability, transparency and smoothness.

The surface of the substrate on which a recording layer is to be coated may be provided with an undercoating layer for the purpose of improving smoothness, adhesion to the recording layer and recording sensitivity to increase S/N ratio, or preventing the recording layer from being denatured. Examples of the material of the undercoating layer include polymer materials such as polymethyl methacrylate, acrylic acid-methacrylic acid copolymer, polyethylene, polypropylene and polycarbonate; organic materials such as silane coupling agent; and inorganic materials such as inorganic oxide (e.g., $SiO_2$ and $Al_2O_3$) and inorganic fluoride (e.g., $MgF_2$).

The undercoating layer can be formed on the substrate, for instance, by dissolving or dispersing the above-mentioned material in an appropriate solvent to prepare a coating solution, and then applying the coating solution onto the surface of the substrate by a conventional coating method such as spin coating, dip coating or extrusion coating.

On the surface of the substrate (or undercoating layer) may be provided a pre-groove layer for the formation of tracking grooves or protruded and depressed portions representing information such as address signals. As a material of the pre-groove layer, there can be used a mixture of at least one monomer (or oligomer) selected from the group consisting of monoesters, diesters and triesters of acrylic acid and a photopolymerization initiator.

The pre-groove layer can be formed on the substrate (or undercoating layer), for instance, by the following process. In the first place, a mixture of the above-mentioned acrylic acid ester and photopolymerization initiator is coated over a precisely-produced stamper. On the coated layer of the mixture is placed the substrate. Then, the coated layer is irradiated with ultraviolet rays through the substrate or the stamper so as to cure the coated layer, whereby the substrate and the coated layer are bonded to each other. Subsequently, the substrate is separated from the stamper. Thus, the substrate having a pre-groove layer thereon is obtained. The thickness of the pre-groove layer is generally in the range of 0.05 to 100 μm, preferably 0.1 to 50 μm.

Otherwise, when the substrate is made of plastic, the pre-groove can be formed directly on the substrate by a molding process such as injection molding or compression molding.

Subsequently, a chlorinated polyolefin layer is provided on the surface of the substrate (or on the surface of the undercoating layer or pre-groove layer in the case that such layer is provided on the substrate, or on the pre-grooves in the case that such grooves are provided directly on the substrate).

Chlorinated polyolefin employable in the invention has chlorination ratio of not less than 30%, preferably not less than 50%, more preferably in the range of 50 to 70%. The chlorination ratio means a value of a molar amount of substituent chlorine atom per a molar amount of hydrogen atom of an original (i.e., unsubstituted) polyolefin.

Among the chlorinated polyolefins, particularly preferred are chlorinated polyethylene and chlorinated polypropylene from the viewpoints of heat-stability and solubility.

The chlorinated polyolefin layer can be formed on the substrate by dissolving the above-mentioned chlorinated polyolefin in an appropriate solvent to prepare a coating solution (or dispersion), and applying the coating solution onto the substrate.

Examples of the solvent for dissolving the chlorinated polyolefin include toluene, xylene, ethyl acetate, butyl acetate, cellosolve acetate, methyl ethyl ketone, 1,2-dichloroethane, methyl isobutyl ketone, cyclohexane, cyclohexanone, tetrahydrofuran, diethyl ether, and dioxane.

The coating solution for the formation of a chlorinated polyolefin layer may further contain other additives such as a plasticizer and a lubricant according to the purpose.

The coating solution can be applied onto the substrate by a conventional coating method such as spray coating, spin coating, dip coating, roll coating, blade coating, doctor roll coating or screen printing.

The substrate (or undercoating layer) having a layer of the coating solution thereon is dried to form a chlorinated polyolefin layer on the substrate. The thickness of the chlorinated polyolefin layer is preferably in the range of 0.005 to 10 $\mu$m.

On the surface of the chlorinated polyolefin layer, a recording layer is then formed in the recording area.

Examples of material employable for the recording layer include metals such as Te, Zn, In, Sn, Zr, Al, Cu and Ga; semi-metals such as Bi, As and Sb; semiconductors such as Ge and Si; and their alloys and various combinations thereof. Further, sulfides, oxides, borides, silicides, carbides and nitrides of these metals and these semi-metals and mixtures of these compounds and the above stated metals can be also employed as the material of the recording layer. Preferably employed is a mixture of at least one metal compound selected from the group consisting of metal sulfide, metal oxide and metal fluoride, and a metal having surface tension of not less than 600 dyne/cm at a temperature ranging from its melting point to 300° C. above the melting point. Further, the metal having such surface tension preferably exists in the recording layer in such a manner the metal has higher concentration on the substrate-side of the recording layer. More concretely, the recording layer is preferably composed of a mixture of In, GeS and Au, and has higher concentration of Au on the substrate-side of the layer. The recording layer having such composition is described in U.S. patent application Ser. No. 868,126 filed on May 28, 1986.

The recording layer can be formed of other materials such as dye.

The recording layer can be formed on the chlorinated polyolefin layer using the above-mentioned material by means of metallizing, sputtering or ion plating process. For providing concentration gradient of the components in the recording layer, the amount of the components is relatively varied in the preparation stage of the recording layer such as metallizing. The recording layer may be composed of a single layer or plural layers. The thickness of the recording layer is generally in the range of 100 to 5,500 angstroms from the viewpoint of optical density required for the optical recording.

A thin film of an inorganic material such as silicon dioxide, tin oxide and manganese fluoride, or a polymer material such as thermoplastic resin and photo-setting resin may be formed on the free surface of the substrate (the surface not facing the recording layer) by means of vacuum metallizing or sputtering process in order to increase resistance to damage and moisture proofness.

After the formation of the recording layer on the substrates, two substrates are bonded to each other with an adhesive agent directly or via spacers in such a manner that the recording layer is positioned inside the substrates.

According to the present invention, bonding between the two substrates or between the substrate and the spacers is done via the aforementioned chlorinated polyolefin layer and an ultraviolet-curable epoxy adhesive.

In the case of using spacers, examples of the spacer material employable in the invention include metals such as stainless and aluminum, synthetic resins such as polycarbonate, polymethyl methacrylate and acetal resin, glass and ceramics. It is also preferred to use spacers made of metallic aluminum having been subjected to anodizing process (i.e., anodized aluminum spacer). The spacer material is preferably the same as that of the substrates. In this case, the resulting recording medium shows a very stable mechanical strength in a repeated use under conditions that the surrounding temperature and/or the relative humidity vary, because the substrates and the spacers shrink and expand simultaneously to the same extent with variations of the temperature and relative humidity.

The adhesive employable in the invention is an ultraviolet-curable epoxy adhesive (herein also referred to as UV-curable epoxy adhesive). The UV-curable epoxy adhesive is cured by irradiation with ultraviolet rays, and is very excellent particularly in giveing enhanced mechanical strength (endurance).

The UV-curable epoxy adhesive contains a photopolymerization initiator producing a cationic polymerization initiator by irradiation with ultraviolet rays and an epoxy resin having two or more epoxy groups in a molecule.

Examples of the photopolymerization initiator producing a cationic polymerization initiator include the following compounds:
diazonium salts such as
  (1) $ArN_2+PF_6-$,
  (2) $ArN_2+SbF_6-$,
  (3) $ArN_2+AsF_6-$,
  (4) $(ArN_2+)_2SnCl_6-$,
  (5) $ArN_2+FeCl_4-$,
  (6) $(ArN_2+)_2BiCl_5-$, and
  (7) $ArN_2+SbCl_6-$
in which Ar is $C_6H_5$;

onium salts such as

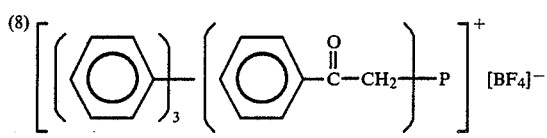

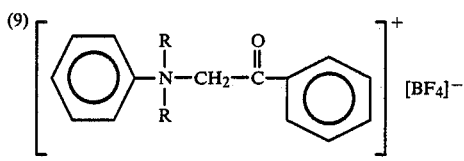

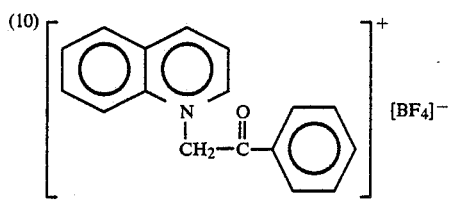

(11) Ar$_2$I$^+$X$^-$, and
(12) Ar$_3$S$^+$X$^-$ in which X is BF$_4^-$, PF$_6^-$, AsF$_6^-$ or SbF$_6^-$, and R is H or an alkyl group having 1–10 carbon atoms, thiopirium salts such as

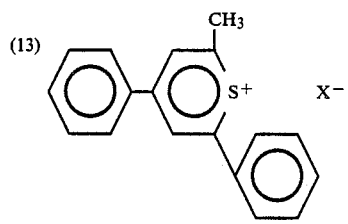

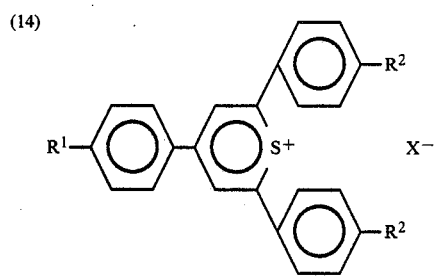

in which R$^1$ is H, OCH$_3$, NO$_2$ or Cl, R$^2$ is H, CH$_3$ or OCH$_3$, and X$^-$ is BF$_4^-$ or PF$_6^-$; and
hydroxybenzophenonemethane sulfonate ester compounds such as

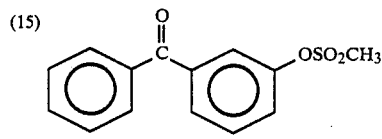

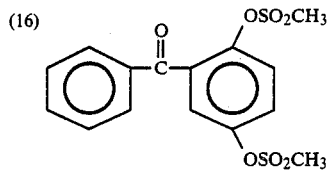

These photopolymerization initiators can be employed singly or in combination. From the viewpoint of acceleration of the polymerization reaction, the initiators may be incorporated together with a sensitizing agent having absorption wavelength in the range of 300–500 nm, preferably 330–450 nm, such as anthracene, benzophenone, pyrene, thioxanthone or phenothiazine.

Examples of the epoxy compound having two or more epoxy groups in the molecule are as follows:

(a)

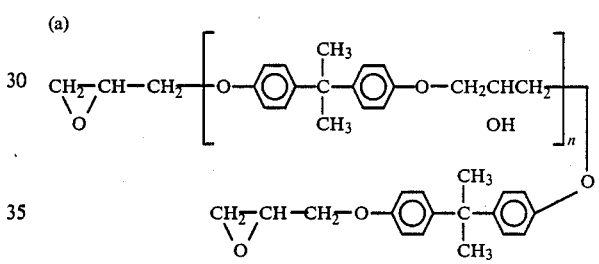

in which n is an integer of from 0 to 15, and esters of the above-mentioned compound (a) and a fatty acid of soybean oil, castor oil, coconut oil, and the like;

(b)

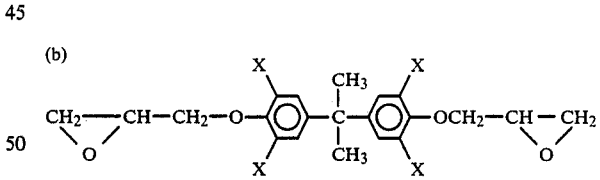

in which X is Cl or Br;

(c)

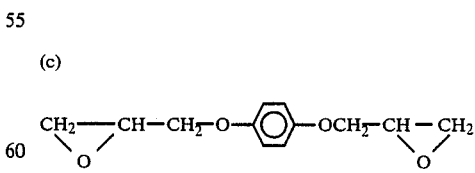

(d)

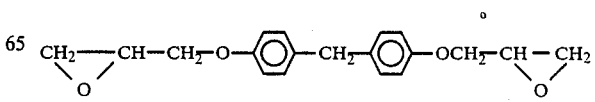

(e)

$$\underset{O}{CH_2-CH-CH_2-O}\phantom{xx}\underset{\phantom{O}}{\text{Ar}_2\text{C(C}_6\text{H}_4\text{)}_2\text{CH(C}_6\text{H}_4\text{)}_2}\phantom{xx}\underset{O}{OCH_2-CH-CH_2}$$

[Tetraglycidyl ether of tetraphenolethane structure with four epoxy groups attached via –OCH₂– linkers to four phenyl rings joined at a central CH–CH]

(f)

[Phenol novolac type epoxy resin with repeating unit; glycidyl ether groups on phenyl rings connected by CH₂ bridges]

in which n is an integer of from 0 to 2;

(g)

$$CH_2-CH-CH_2-O{-\!\!\left[CH_2\overset{R}{C}HO-CH_2\right]_{\!n}\!\!-\!\!}\overset{R}{C}H-O-CH_2-CH-CH_2$$
$$\underset{O}{\diagdown\!\!\diagup}\phantom{xxxxxxxxxxxxxxxxxxxxxxxxxxxxxx}\underset{O}{\diagdown\!\!\diagup}$$

in which R is hydrogen or methyl, and n is an integer of from 1 to 10;

(h)
$$CH_2-O-CH_2-CH-CH_2$$
$$\phantom{CH_2-O-CH_2-}\underset{O}{\diagdown\!\!\diagup}$$
$$CH_2-O-CH_2-CH-CH_2$$
$$\phantom{CH_2-O-CH_2-}\underset{O}{\diagdown\!\!\diagup}$$
$$CH_2-O-CH_2-CH-CH_2$$
$$\phantom{CH_2-O-CH_2-}\underset{O}{\diagdown\!\!\diagup}$$

(i) $R-CH_2-CH-CH-CH_2-CH_2-CH-CH-CH_2$
$\phantom{R-CH_2-}|\phantom{-}|\phantom{-CH_2-CH_2-}\diagdown\!\!\diagup\phantom{--}\diagdown$
$\phantom{R-CH_2-}OH\phantom{-}OCOCH_3\phantom{--}O\phantom{---}CH_2$ $R-CH-CH_2-CH-CH_2-CH_2-CH=CH$
$\phantom{R-}|\phantom{-CH_2-}|$
$\phantom{R-}CH\phantom{-CH_2-}CH$
$\diagup|\phantom{-CH_2-}\diagup|$
$O-CH_2\phantom{-}O-CH_2$ in which R is hydrogen or methyl;

(j) $CH_2-OCO-(CH_2)_n-CH-CH-(CH_2)_m-CH_3$
$\phantom{CH_2-OCO-(CH_2)_n-}\diagdown\!\!\diagup$
$\phantom{CH_2-OCO-(CH_2)_n-}O$
$|$
$CH-OCO-(CH_2)_n-CH-CH-(CH_2)_m-CH_3$
$\phantom{CH-OCO-(CH_2)_n-}\diagdown\!\!\diagup$
$\phantom{CH-OCO-(CH_2)_n-}O$
$|$
$CH_2-OCO-(CH_2)_n-CH-CH-(CH_2)_m-CH_3$
$\phantom{CH_2-OCO-(CH_2)_n-}\diagdown\!\!\diagup$
$\phantom{CH_2-OCO-(CH_2)_n-}O$ in which each of m and n is an integer of from 1 to 10;

(k) [cyclohexane ring fused with epoxide, bearing CH–CH₂ epoxide substituent]

(l) [bicyclic diepoxide with CH₂ bridge]

(m) [bis(cyclohexene oxide) linked by CH₂–OC(O)– with methyl substituents]

(n) [bis(cyclohexene oxide) linked by CH₂–OC(O)–]

and (o) fatty acid esters of the above-mentioned compound (a).

These epoxy compounds can be employed in combination.

The ratio of the photopolymerization initiator to the epoxy resin is preferably in the range of 0.0001 to 0.1 (photopolymerization initiator/epoxy resin). When the ratio is less than 0.0001, curing speed becomes too low. When the ratio exceeds 0.1, cohesive force of the adhesive is liable to decrease.

In addition to the above-described photopolymerization initiator and epoxy resin, the adhesive composition of the invention may further contain a reactive diluent such as phenyl glycidyl ether or an unreactive diluent such as xylene for the purpose of reducing the viscosity of the adhesive.

In the information recording medium of the invention, a primer layer may be provided between the chlorinated polyolefin layer and the UV-curable epoxy adhesive layer in the combined region.

There is no specific limitation on the primer employable in the invention, and the primer is generally selected in consideration of the material for receiving the primer layer and affinity for the employed adhesive. The primer employable in the invention preferably contains a compound having an epoxy group.

As a compound having an epoxy group and serving as a primer, a great number of compounds are known, and those known compounds can be also employed in the invention. Examples of the compound having an epoxy group and serving as a primer include the aforementioned epoxy compounds having the formulas (a) to (o) in which two or more epoxy groups are contained.

Those epoxy compounds can be employed in combination.

The primer layer can be generally formed on the chlorinated polyolefin layer by coating a primer solution containing a primer in an appropriate solvent over the combined region, and then drying the layer of the primer solution to remove the solvent. Coating of the primer solution can be carried out by a conventional coating method such as brush coating, spray coating and transfer coating.

Bonding between the two substrates or between the substrate and spacer can be done by the following process. In the first place, the above-mentioned UV-curable epoxy adhesive is coated over the substrate having the chlorinated polyolefin layer (or further the primer layer) thereon or over the ring-shaped inner spacer and ring-shaped outer spacer by means of a transfer printing method, etc. By means of the adhesive the two substrates are bonded to each other directly or via spacers in an inert gas atmosphere, and then the ultraviolet rays are irradiated to cure the adhesive under the polymerization reaction.

The examples and the comparison examples of the invention are given below. In the following examples, the term "part(s)" means "part(s) by weight", unless otherwise specified.

EXAMPLE 1

Each of two disc-shaped polycarbonate substrates (outer diameter: 130 mm, inner diameter: 15 mm, thickness 1.2 mm, track pitch 1.6 μm) having been provided with grooves on one surface by injection molding was applied with a coating solution (dispersion) having the following composition on the groove-provided surface by means of spin coating.

| | |
|---|---|
| $-(C_2H_{4-x}Cl_x)_n-$ (chlorinated polyethylene, $x = 1.7$, $n = 200$) | 0.2 part |
| Methyl ethyl ketone | 10 parts |
| cyclohexane | 100 parts |

The coated layer of the dispersion was dried to form a chlorinated polyethylene layer having the thickness of 0.02 μm (in dry state) on the substrate.

On the chlorinated polyethylene layer was codeposited In, Au and GeS in the amount of 65 wt.%, 5 wt.% and 30 wt.%, respectively, to form a recording layer having the thickness of 300 angstrom. In this deposition, voltage of the electric current given to the evaporation source of Au was controlled in such a manner that the concentration of Au would be higher on the substrate-side and become lower on the surface of the recording layer.

Onto the surface of the chlorinated polyethylene layer via which the above-mentioned two substrates were to be bonded to each other was applied with a 0.1 wt.% methyl ethyl ketone solution of Bisphenol A-type epoxy compound (Epicoat 828, available from Shell Chemicals Co., Ltd.), and the coated layer was dried to form a primer layer on the chlorinated polyethylene layer.

On the surface of the primer layer where a ring-shaped inner spacer and a ring-shaped outer spacer, both made of polycarbonate resin, were to be provided was coated with an ultraviolet-curable epoxy adhesive having the following composition in the thickness of 50 μm.

| | |
|---|---|
|  | 1 part |

| | |
|---|---|
| 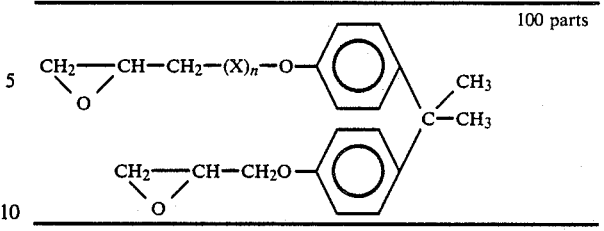 | 100 parts | in which

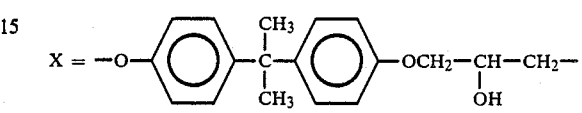

The two substrates coated with the primer layer and the adhesive layer were bonded to each other in a nitrogen gas atmosphere via the primer layer and the adhesive layer by interposing the inner and outer spacers therebetween in such a manner that the recording layer would be positioned inside the two substrates. The bonded substrates were then irradiated with ultraviolet rays for 2 min. from both sides at distance of 30 cm from the surface of the substrate by means of a high-voltage mercury lamp of 1 kw.

Thus, an information recording medium having air-sandwich structure as shown in FIG. 3 was prepared.

EXAMPLE 2

The procedure of Example 1 was repeated except for not providing a primer layer on the chlorinated polyethylene layer, to prepare an information recording medium of air-sandwich structure.

COMPARISON EXAMPLE 1

The procedure of Example 1 was repeated except for not providing a chlorinated polyethylene layer on the substrate, to prepare an information recording medium of air-sandwich structure.

COMPARISON EXAMPLE 2

The procedure of Example 1 was repeated except for not providing a chlorinated polyethylene layer and a primer layer on the substrate, to prepare an information recording medium of air-sandwich structure.

Each of the information recording media prepared as above was evaluated on the adhesion in the combined region and the recording sensitivity according to the following tests. In the evaluations, each test strip and each resulting medium was tested with time as follows:

(a) immediately after the preparation;
(b) after storage of 60 days at a constant temperature and humidity bath of 60° C. and 90%RH; and
(c) after storage of 120 days at a constant temperature and humidity bath of 60° C. and 90%RH.

(1) Adhesion Test

A chlorinated polyethylene layer was provided on the surface of each of two L-shaped flat polycarbonate plates (thickness: 1.5 mm) in the same manner as described in Example 1. Then, on the chlorinated polyethylene layer was formed a primer layer, on which was further coated an UV-curable adhesive, in the same manner as described in Example 1.

The two polycarbonate plates were bonded to each other through the UV-curable adhesive, and then irradiated with the ultraviolet rays for 2 min. from both sides at distance of 30 cm from the surface of the plate by means of a high-pressure mercury vapor lamp of 1 kw, to cure the adhesive. Thus, test strip I was prepared.

The above-described procedure was repeated except for not providing a primer layer to prepare test strip II.

Further, the above-described procedure was repeated except for not providing a chlorinated polyethylene layer to prepare test strip III.

Furthermore, the above-described procedure was repeated except for not providing a chlorinated polyethylene layer and a primer layer to prepare test strip IV.

Each of the test strips 1 to 4 prepared as above was evaluated on the adhesion in the combined region according to a tensile test. The tensile strength was measured at 25° C. using a tensile testing machine at 0.1 mm/min to measure tensile strength (kg/cm$^2$) at which the bonded layers were separated from each other.

The results are set forth in Table 1.

TABLE 1

|  | Tensile Strength (kg/cm$^2$) | | |
| --- | --- | --- | --- |
|  | (a) | (b) | (c) |
| Test strip I | 5 | 7 | 7 |
| Test strip II | 5 | 7 | 7 |
| Test strip III | 3 | 5 | 5 |
| Test strip IV | 1.5 | 0 | 0 |

(2) Recording Sensitivity Test

Each of the obtained recording media was recorded with information by providing pits on the recording layer under rotation of the medium at 515 r.p.m. by means of a semiconductor laser (wavelength: 820 nm) under the conditions of 1.25 MHz and duty ratio of 1:1, to measure the minimum laser output capable of forming a pit.

The results are set forth in Table 2.

TABLE 2

|  | Sensitivity (mW) | | |
| --- | --- | --- | --- |
|  | (a) | (b) | (c) |
| Example 1 | 5 | 5 (no separated) | 5 (no separated) |
| Example 2 | 5 | 5 (no separated) | 5 (no separated) |
| Com. Example 1 | 7 | 7 (no separated) | 9 (some separated) |
| Com. Example 2 | 7 | 9 (separated) | 12 (separated) |

As is evident from the results set forth in Tables 1 and 2, the information recording media of the invention (test strips 1 and 2) had prominently high adhesion and high mechanical endurance (mechanical strength) in the combined region even after storage of 120 days under the conditions of temperature at 60° C. and a humidity of 90%RH. On the contrary, the information recording media for comparison (test strips 3 and 4) had low adhesion, and decreased in the adhesion particularly after a long period of time.

Further, the information recording media of the present invention (Examples 1 and 2) never decreased in the sensitivity even after storage of 120 days under the conditions of temperature of 60° C. and a humidity of 90%RH, and had stable sensitivity with time. In addition, the recording media of the invention had no separation between the layers in the combined region. On the contrary, the information recording media (Comparison Example 1 and 2) prominently decreased in the recording sensitivity with time, and the layers inthe combined region were separated from each other.

We claim:

1. In an information recording medium comprising two disc-shaped substrates, said two substrates being combined with each other directly or via a ring-shaped inner spacer and a ring-shaped outer spacer by means of an adhesive, and a recording layer for writing or reading information with laser beam which is provided on the inner surface of at least one substrate, the improvement wherein a layer of chlorinated polyolefin is provided between the substrate and the recording layer and further on the area where the substrate is combined with another substrate or the spacers, and said adhesive is an ultraviolet-curable epoxy adhesive which is arranged on the chlorinated polyolefin layer.

2. The information recording medium as claimed in claim 1, wherein said chlorinated polyolefin is chlorinated polyethylene or chlorinated polypropylene.

3. The information recording medium as claimed in claim 1, wherein said chlorinated polyolefin has a chlorination ratio of more than 30%.

4. The information recording medium as claimed in claim 1, wherein said chlorinated polyolefin layer has a thickness in the range of 0.005 to 10 μm.

5. The information recording medium as claimed in claim 1, wherein said ultraviolet-curable epoxy adhesive comprises a photopolymerization initiator and an epoxy compound containing at least two epoxy groups in the molecule.

6. In an information recording medium comprising two disc-shaped substrates, said two substrates being combined with each other directly or via a ring-shaped inner spacer and a ring-shaped outer spacer by means of an adhesive, and a recording layer for writing or reading information with laser beam which is provided on the inner surface of at least one substrate, the improvement wherein a layer of chlorinated polyolefin is provided between the substrate and the recording layer and further on the area where the substrate is combined with another substrate or the spacers, and said adhesive is an ultraviolet-curable epoxy adhesive which is arranged on the chlorinated polyolefin layer via a primer layer.

7. The information recording medium as claimed in claim 6, wherein said chlorinated polyolefin is chlorinated polyethylene or chlorinated polypropylene.

8. The information recording medium as claimed in claim 6, wherein said chlorinated polyolefin has a chlorination ratio of more than 30%.

9. The information recording medium as claimed in claim 6, wherein said chlorinated polyolefin layer has a thickness in the range of 0.005 to 10 μm.

10. The information recording medium as claimed in claim 6, wherein said ultraviolet-curable epoxy adhesive comprises a photopolymerization initiator and an epoxy compound containing at least two epoxy groups in the molecule.

11. The information recording medium as claimed in claim 6, wherein said primer layer is made of an epoxy compound containing at least two epoxy groups in the molecule.

* * * * *